UNITED STATES PATENT OFFICE.

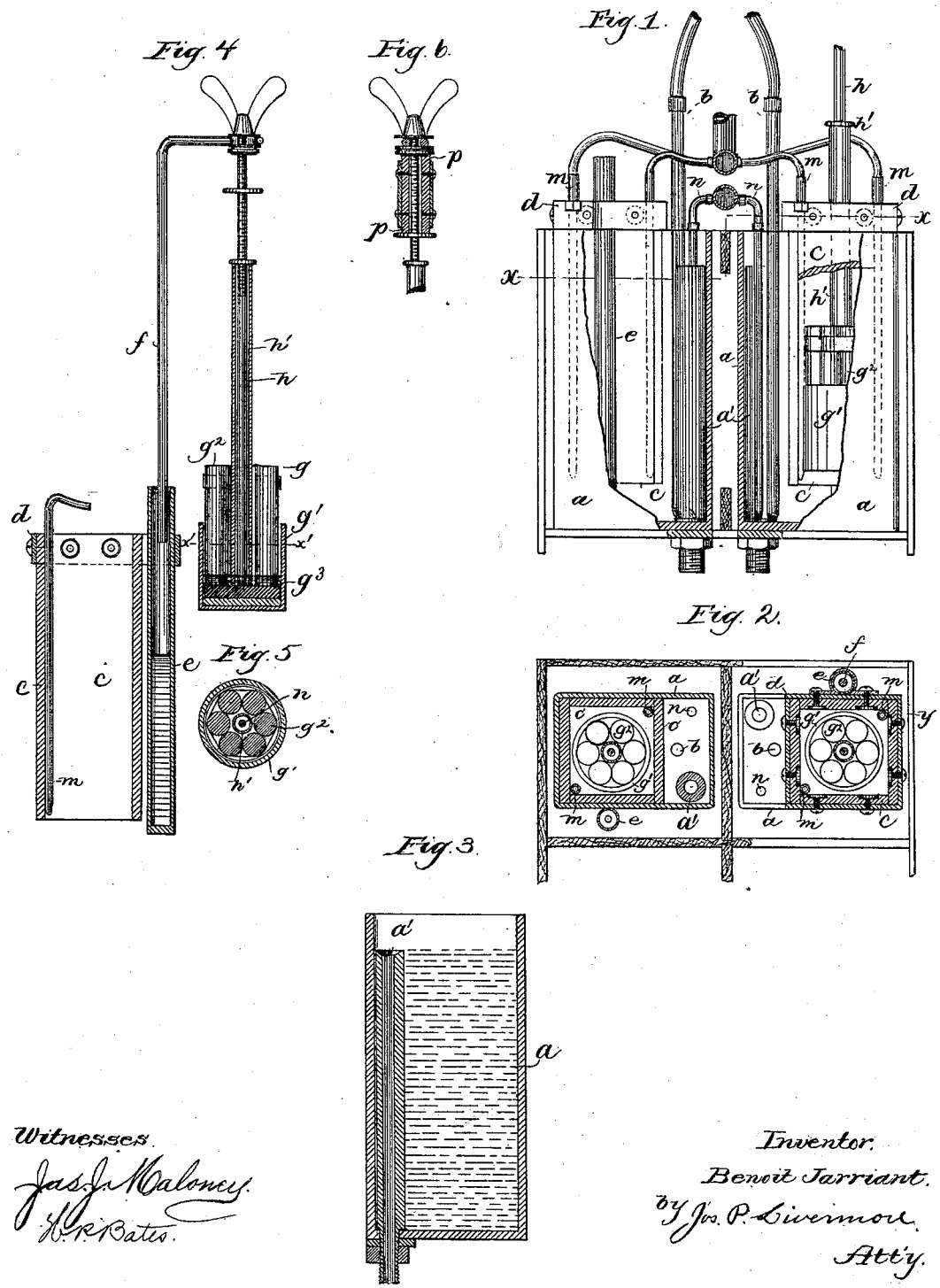

BENOIT JARRIANT, OF PARIS, FRANCE, ASSIGNOR, BY MESNE ASSIGNMENTS, TO THE CHEMICAL ELECTRIC LIGHT AND POWER COMPANY, OF PORTLAND, MAINE.

GALVANIC BATTERY.

SPECIFICATION forming part of Letters Patent No. 349,222, dated September 14, 1886.

Application filed May 6, 1886. Serial No. 201,399. (No model.) Patented in France January 12, 1882, No. 146,811, and in England April 25, 1882, No. 1,956.

*To all whom it may concern:*

Be it known that I, BENOIT JARRIANT, of Paris, France, have invented an Improvement in Galvanic Batteries, of which the following description, in connection with the accompanying drawings, is a specification, like letters on the drawings representing like parts.

The object of this invention relating to galvanic batteries is to produce a battery having great constancy in action and capable of generating powerful electric currents at moderate expense. The single liquid batteries in which bichromate of potash is used as a part of the exciting and depolarizing fluid are unsuitable for electric lighting or other similar purposes requiring the battery to work on a closed circuit for a considerable period of time, on account of the inconstancy and rapid weakening of the current.

The present invention consists mainly in a new exciting and depolarizing fluid, the main novelty of which consists in the employment of bichromate of soda as the depolarizing agent. The exciting and depolarizing fluid may consist of the following materials, in about the proportions stated, namely: bichromate of soda mixed with about three times its weight of sulphuric acid at about sixty-six degrees strength, and about ten times its weight of water. A fluid of this kind co-operating with the usual carbon and zinc elements of the battery will produce a current that is far more effective than that of the well-known bichromate-of-potash batteries, and of far greater constancy and duration. For the purpose of illustration a galvanic battery is shown which I believe has novel features of construction, but which are not herein claimed, and it is obvious that the novel battery-fluid forming the subject of this invention is equally applicable to batteries of other construction than that shown.

Figure 1 is a side elevation, partly in section, of two cells forming a part of the galvanic battery that may be used with the fluid embodying this invention; Fig. 2, a horizontal section thereof on line $x\ x$, Fig. 1; Fig. 3, a vertical section on line $y$, Fig. 2, of the receptacle that contains the fluid and electrodes of the battery; Fig. 4, a vertical section of the electrodes or elements of the battery; Fig. 5, a horizontal section on line $x'$, Fig. 4, of the positive or zinc element of the battery; Fig. 6, a detail to be referred to.

As shown in this instance, the battery-fluid containing bichromate of soda is held in a jar or receptacle, $a$, (see Fig. 3,) forming one cell of the battery, made of impervious material that will not be attacked by acids—such, for instance, as ebonite or porcelain—and being shown as provided with an overflow-pipe, $a'$, which limits the height to which the battery-fluid can rise in the said cell, as indicated in Fig. 3, the said fluid not being represented in the other figures for the sake of greater clearness. The fluid may be introduced into the cells from time to time, as required, by means of pipes $b$, leading from a suitable reservoir and arranged to deliver the fresh fluid at the lower part of the receptacle. The positive pole (negative element) is shown as composed of four carbon plates, $c$, connected at the top by a collar or frame, $d$, which may be lead or other metal, galvanized or tinned, and projects from the carbon plates so as to rest on the upper edges of the cell $a$, and support the said plates therein, as clearly shown in Figs. 1 and 2. The said frame $d$ has attached to it and in electrical communication with it a tube, $e$, (best shown in Fig. 4,) containing mercury, in which the connecting-conductor $f$ from the positive element or electrode (negative pole) $g$ of the next cell can rise and fall and maintain electrical communication between the said positive and negative elements or electrodes, while the positive element is raised or lowered in order to remove it from or place it in the battery-fluid for the purpose of stopping or of starting the operation of the battery. The positive element or electrode (negative pole) is composed of a vessel, $g'$, which may be of vulcanite or other insulating material capable of resisting the action of acids, in the middle of which vessel is fixed a conductor, $h$, which may be a copper rod protected by a tube, $h'$, of insulating material, and connected outside the element with the conductor $f$, that dips in the mercury in the tube $e$ of the positive pole of the neighboring cell, as shown in Fig. 4. The vessel $g'$ contains pieces $g^2$ of zinc, and also contains mercury, as shown at $g^3$, Fig. 4, which keeps the zinc properly amalgamated and forms an efficient electrical connection between the different pieces of zinc and the conductor $h$. The battery is also shown as containing other appliances for improving and facilitating its action—such, for instance, as tubes $m$, for supplying air to the surface of the carbon, and tubes $n$, which may be used for pumping out or drawing off the fluid from the cells, and connecting-bars $p$, (see Fig. 6,) of insulating material, for mechanically connecting the positive elements $g$ of a number of cells, so that they all may be raised or lowered simultaneously. These features and appliances are not, however, claimed in the present application, and will be more fully described in connection with another application, that will be limited to mechanical appliances employed in the battery.

I claim—

1. In a galvanic battery, a fluid one element of which is bichromate of soda, substantially as described.

2. The combination, in a galvanic battery, of positive and negative elements or electrodes and a mixture of bichromate of soda, sulphuric acid, and water, substantially as described.

In testimony whereof I have signed my name to this specification in the presence of two subscribing witnesses.

BENOIT JARRIANT.

Witnesses:
ROBT. M. HOOPER,
ALBERT MOREAU.